US011744251B2

(12) United States Patent
Hughes, Jr.

(10) Patent No.: US 11,744,251 B2
(45) Date of Patent: Sep. 5, 2023

(54) COMMERCIAL CONFECTION MIXER APPARATUS

(71) Applicant: John Hughes, Jr., Belleville, MI (US)

(72) Inventor: John Hughes, Jr., Belleville, MI (US)

(*) Notice: Subject to any disclaimer, the term of this patent is extended or adjusted under 35 U.S.C. 154(b) by 381 days.

(21) Appl. No.: 16/850,488

(22) Filed: Apr. 16, 2020

(65) Prior Publication Data

US 2020/0329718 A1 Oct. 22, 2020

Related U.S. Application Data

(60) Provisional application No. 62/835,831, filed on Apr. 18, 2019.

(51) Int. Cl.
| | | |
|---|---|---|
| *A21C 1/00* | (2006.01) | |
| *A21C 1/14* | (2006.01) | |
| *F16K 3/02* | (2006.01) | |
| *B01F 35/50* | (2022.01) | |
| *B01F 35/75* | (2022.01) | |
| *B01F 101/08* | (2022.01) | |

(52) U.S. Cl.
CPC .............. *A21C 1/144* (2013.01); *A21C 1/149* (2013.01); *B01F 35/50* (2022.01); *B01F 35/75471* (2022.01); *F16K 3/0281* (2013.01); *B01F 2101/08* (2022.01)

(58) Field of Classification Search
CPC ............... B01F 35/75471; B01F 35/50; B01F 2101/08; A21C 1/144; A21C 1/149; F16K 3/0281
See application file for complete search history.

(56) References Cited

U.S. PATENT DOCUMENTS 4,170,253 A * 10/1979 McArthur ................ A21C 5/02
222/380
5,322,368 A * 6/1994 Tanaka .................. B01F 35/452
241/101.8

* cited by examiner

*Primary Examiner* — Anshu Bhatia
(74) *Attorney, Agent, or Firm* — Brooks Kushman, P.C.

(57) ABSTRACT

A mixing apparatus may include a bowl defining at least one bowl opening for contents of the bowl to exit therefrom, and a valve assembly configured to selectively attach to the bowl at the bowl opening and including at least one base portion defining a base opening and configured to selectively receive a seal portion, the seal portion being movable between open and close positions, wherein in the open position, the base opening is unobstructed allowing contents of the bowl exit the bowl via the base opening, and in the closed position, the seal portion blocks the base opening preventing contents from exiting the bowl.

12 Claims, 4 Drawing Sheets

COMMERCIAL CONFECTION MIXER APPARATUS

CROSS-REFERENCE TO RELATED APPLICATIONS

This application claims the benefit of U.S. provisional application Ser. No. 62/835,831 filed Apr. 18, 2019, the disclosure of which is hereby incorporated in its entirety by reference herein.

TECHNICAL FIELD

Disclosed herein is a commercial confection mixer apparatus.

BACKGROUND

Commercial mixers are often used to mix ingredients to form dough and other compositions to make confections such as cookies, donuts, rolls, etc. In the commercial baking industry, oftentimes bakers, chefs, etc., are required to produce large amounts of confection products. To increase efficiencies in producing these large quantities, large mixtures of batter are often mixed in large commercial mixers. These mixers have large bowls that, when full of batter, can be heavy for an average user to lift. In some examples, the bowls may be configured to hold 20-30 quarts of batter at a time.

Since the contents of the mixer are often poured onto sheets for baking, it may be difficult for some users to carry, move, and tip the bowls. More so, the process of relocating heavy batter may be cumbersome and may slow down production.

SUMMARY

A mixing apparatus may include a bowl defining at least one bowl opening for contents of the bowl to exit therefrom, and a valve assembly configured to selectively attach to the bowl at the bowl opening and including at least one base portion defining a base opening and configured to selectively receive a seal portion, the seal portion being movable between open and closed positions, wherein in the open position, the base opening is unobstructed allowing contents of the bowl exit the bowl via the base opening, and in the closed position, the seal portion blocks the base opening preventing contents from exiting the bowl.

A valve assembly configured to selectively attach to a mixing bowl may include a base portion defining a base opening configured to align in an installed state with an opening of the mixing bowl, and a stop portion configured to be movable between open and close positions, wherein in the open position, the base opening is unobstructed allowing contents of the bowl to exit the bowl via the base opening, and in the closed position, the stop portion blocks the base opening preventing the contents from exiting the bowl.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
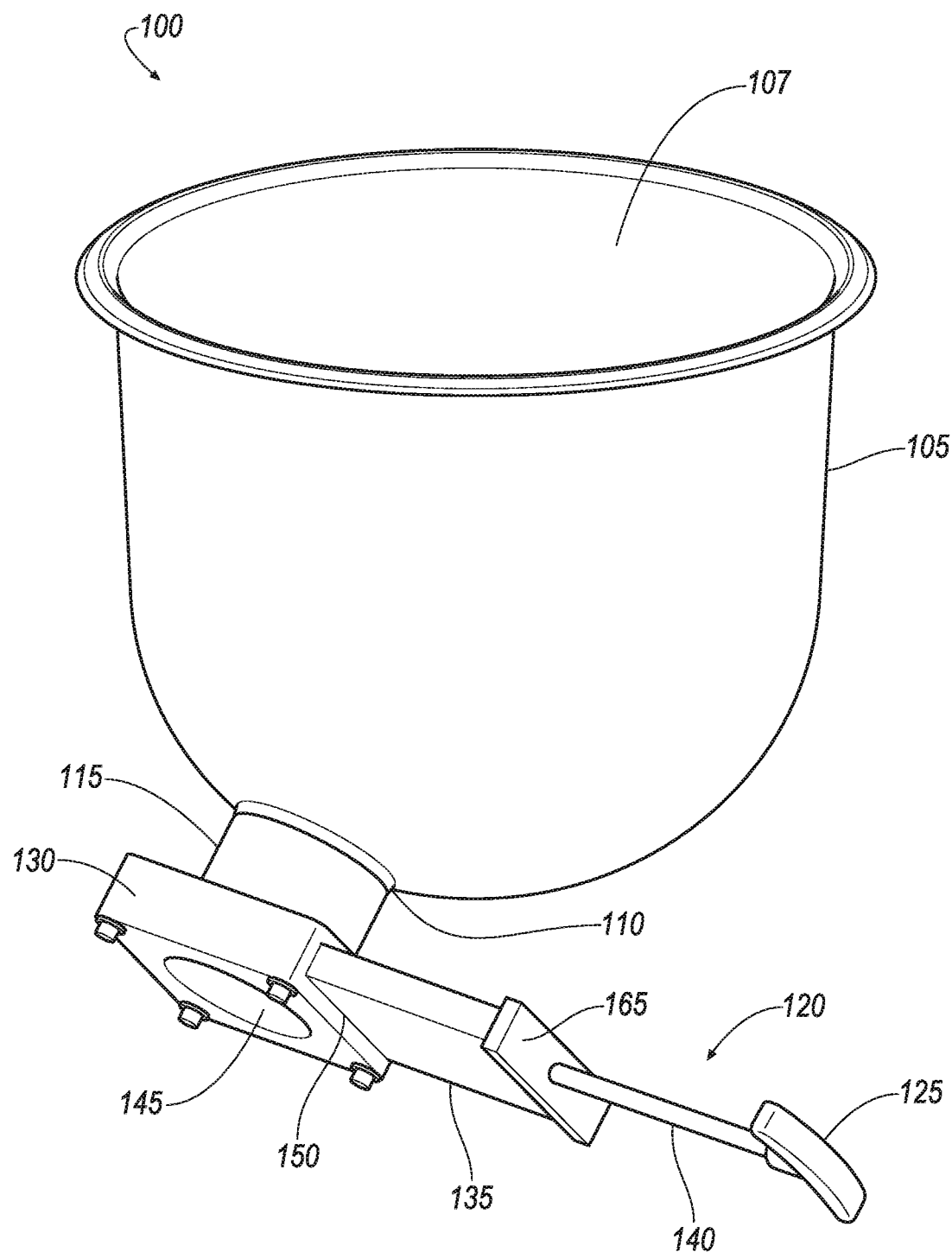
FIG. 1 illustrates a front perspective view of an example mixer apparatus with a valve in an open position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Commercial mixers are often used to mix ingredients to form dough and other compositions to make confections such as cookies, donuts, rolls, etc. In the commercial baking industry, oftentimes bakers, chefs, etc., are required to produce large amounts of confection products. To increase efficiencies in producing these large quantities, large mixtures of batter are often mixed in large commercial mixers. These mixers have large bowls that, when full of batter, can be heavy for an average user to lift. In some examples, the bowls may be configured to hold 20-30 quarts of batter at a time.

Since the contents of the mixer are often poured out from the top of the bowl onto sheets for baking, it may be difficult for some users to carry, move, and tip the bowls. More so, the process of relocating heavy batter may be cumbersome and may slow down production.

Disclosed herein is a commercial confection mixer apparatus including a mixing bowl having a valve configured to release batter from the bowl. Such a valve avoids the need for users to lift and carry heavy bowls full of batter. The valve may facilitate more efficient processes in commercial or high-volume baking.

Referring to FIGS. 1-4, a commercial confection mixer apparatus 100 may include a bowl 105. The bowl 105 may be configured to hold contents such as batter, dough, etc. The bowl 105 may be formed of metal, glass, plastic, other synthetic or semi-synthetic materials, natural materials, or any combination thereof. The bowl 105 may define a mouth 107 configured to receive one or more ingredients into the well, or basin, of the bowl 105. The bowl 105 may maintain the ingredients therein during mixing. The mixing apparatus 100 may include a blade, beater, whip, hook, etc., (not shown) rotated by a motor to mix or kneed the ingredients in the bowl 105 through the mouth 107.

Once the ingredients are mixed, users may be requested or required to transfer the contents to a baking sheet, other bowl, etc. Based on the weight of the contents, this may be difficult, and require loading the bowl 105 onto a wheeled cart, conveyer belt, etc. in order to move the batter or contents from one location to another.

The bowl 105 may define a bowl opening 110 towards the base or bottom of the bowl. In some examples, the inner surface of the bowl 105 may be shaped with a channel or slope towards this opening in an effort to guide batter towards the opening 110. Thus, the contents of the bowl 105 may be guided to the opening via gravity and/or the channel or slope.

A valve 120 may be arranged at or over the bowl opening 110 and may be configured to selectively maintain the contents within the bowl. That is, the valve may open and close to allow the contents to leave the bowl 105 via the valve 120. The valve 120 may include a connecting mechanism 115 configured to attach to the bowl 105. The connecting mechanism 115 may be a lockable (e.g., threaded, latching, pinnable, etc.) and hollow tube configured to mate with a lip (not shown) surrounding the bowl opening 110. The connecting mechanism 115 may be configured to selectively attach to the lip of the bowl opening 110 to form a tube-like portion extending from the bowl 105 at the bowl opening 110.

A base portion 130 may extend from the connecting mechanism 115 and may define a base opening 145. Similar to the bowl 105, the base portion 130 may be formed of metal, glass, plastic, other synthetic or semi-synthetic materials, natural materials, or any combination thereof. The base opening 145 may align with the bowl opening 110 and the connecting mechanism 115. In an open configuration, the base opening 145 may allow the contents to exit the bowl 105 therefrom. The base portion 130 may define a hollow interior and a slot 150 on at least one side thereof.

A stop portion 135 (also referred to herein as a housing 135) may be arranged and attached to one side of the base portion 130. The stop portion 135 may be arranged on the side of the base portion 130 defining the slot 150. The stop portion 135 may define a hollow interior configured to be open to the slot 150. The hollow interior may be configured to receive a seal portion 160 (shown in FIG. 4). The seal portion 160 (shown in phantom in FIG. 2) may be slightly larger in length and width than the diameter of the base opening 145. In the closed position, the seal portion 160 may block the base opening 145, and thus prevent contents from leaving the bowl 105 via the connecting mechanism 115.

The seal portion 160 may be a stiff, but rubber-like material or otherwise slightly malleable material so as to form a hermetic seal at the base opening 145 in the closed position. In one example, the seal portion 160 may be a block covered by a malleable material, such as silicone or rubber. In another example, the seal portion 160 may be the same material as the base portion 130 and may form a snug, hermetical or near hermetical seal within the base portion 130 to prevent any batter or contents from exiting the bowl via the connecting mechanism 115. In some examples, a gasket, O-ring, other seal may be provided on the base portion 130 to ensure a good sealing effect with the seal portion 160 in the closed position.

The seal portion 160 may be attached to a rod 140 and handle 125. The handle 125 may be arranged at a distal end of the rod 140 and may be configured to be gripped or held by the user. In the examples provided, the handle 125 forms an arch-like shape, however, the handle 125 may form any other shape such as a round knob, pull handle, etc. The rod 140 may be made of a metal or plastic material sturdy enough to withstand forces exerted thereupon. The rod 140 may include threaded ends (not shown) and may be configured to screw-fit into one or both of the seal portion 160 and the handle 125.

The rod 140 may be attached to the handle and configured to move with the handle. That is, as the handle is moved, the rod 140 moves. The rod 140 causes the seal portion 160 to slide in and out of the housing 135 through the slot 150 defined by the base portion 130.

The stop portion 135 may include a cap 165 configured to close the stop portion 135 and prevent the seal portion 160 from being pulled from a distal end of the stop portion 135. The cap 165 may be attached to the stop portion 135 via glue, welding, etc. The cap 165 may also provide an aperture through which the rod 140 may freely pass. Additionally or alternatively, the cap 165 and the stop portion 135 may be a single part, in one example, formed of injection molded materials.

Figure 2:
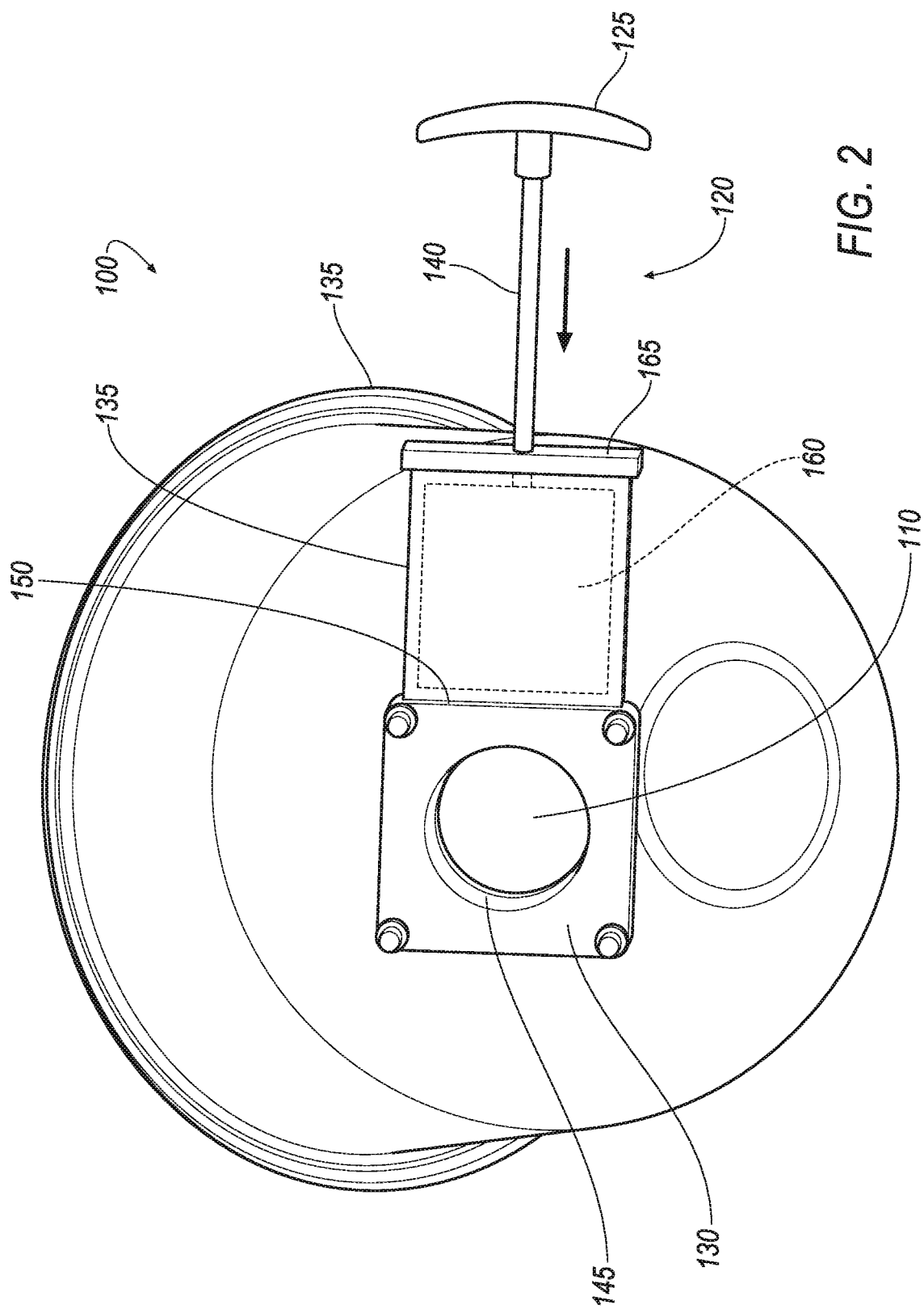
FIG. 2 illustrates a bottom perspective view of the mixer apparatus of FIG. 1.
Figure 3:
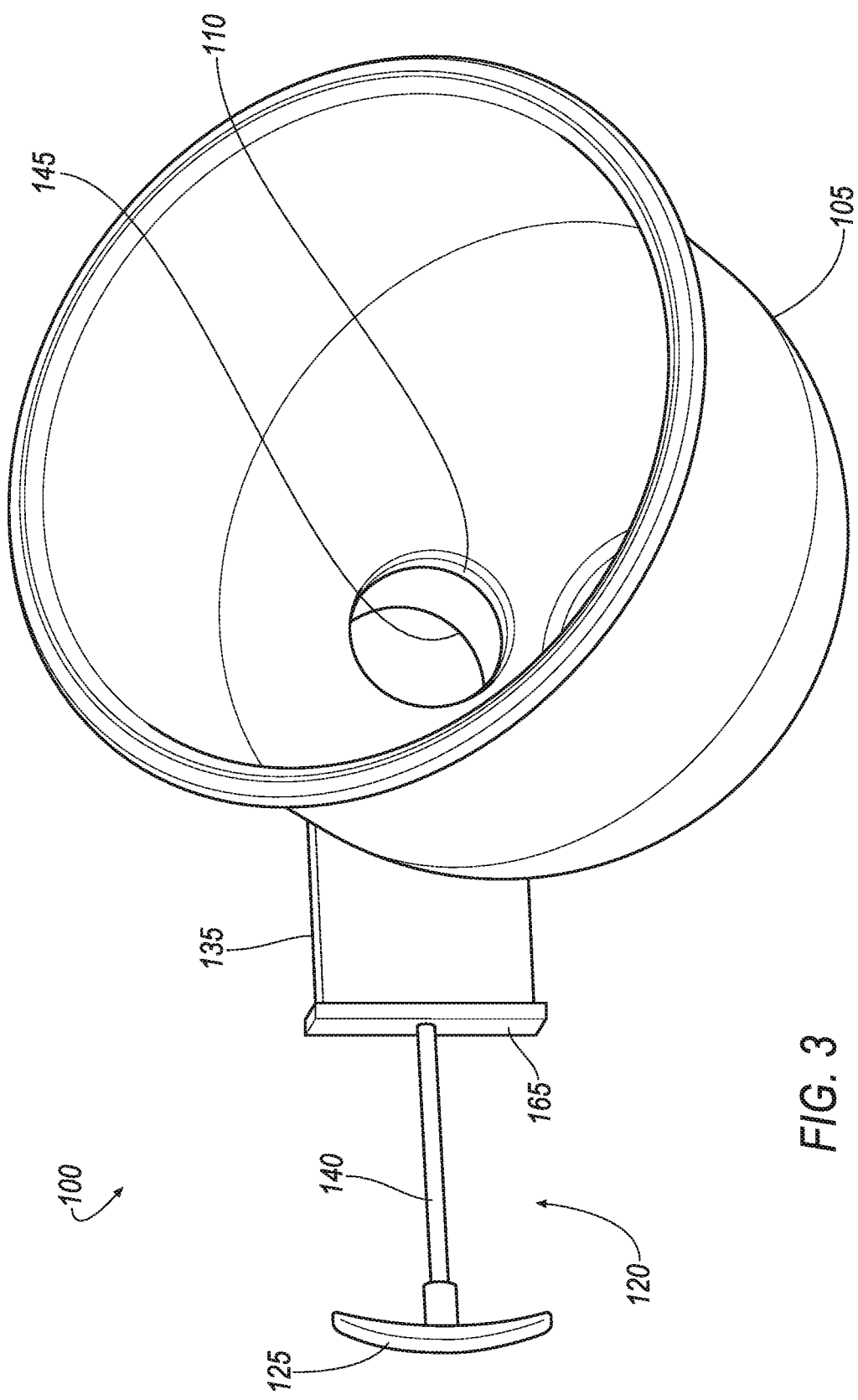
FIG. 3 illustrates a top perspective view of the mixer apparatus of FIG. 1.
Figure 4:
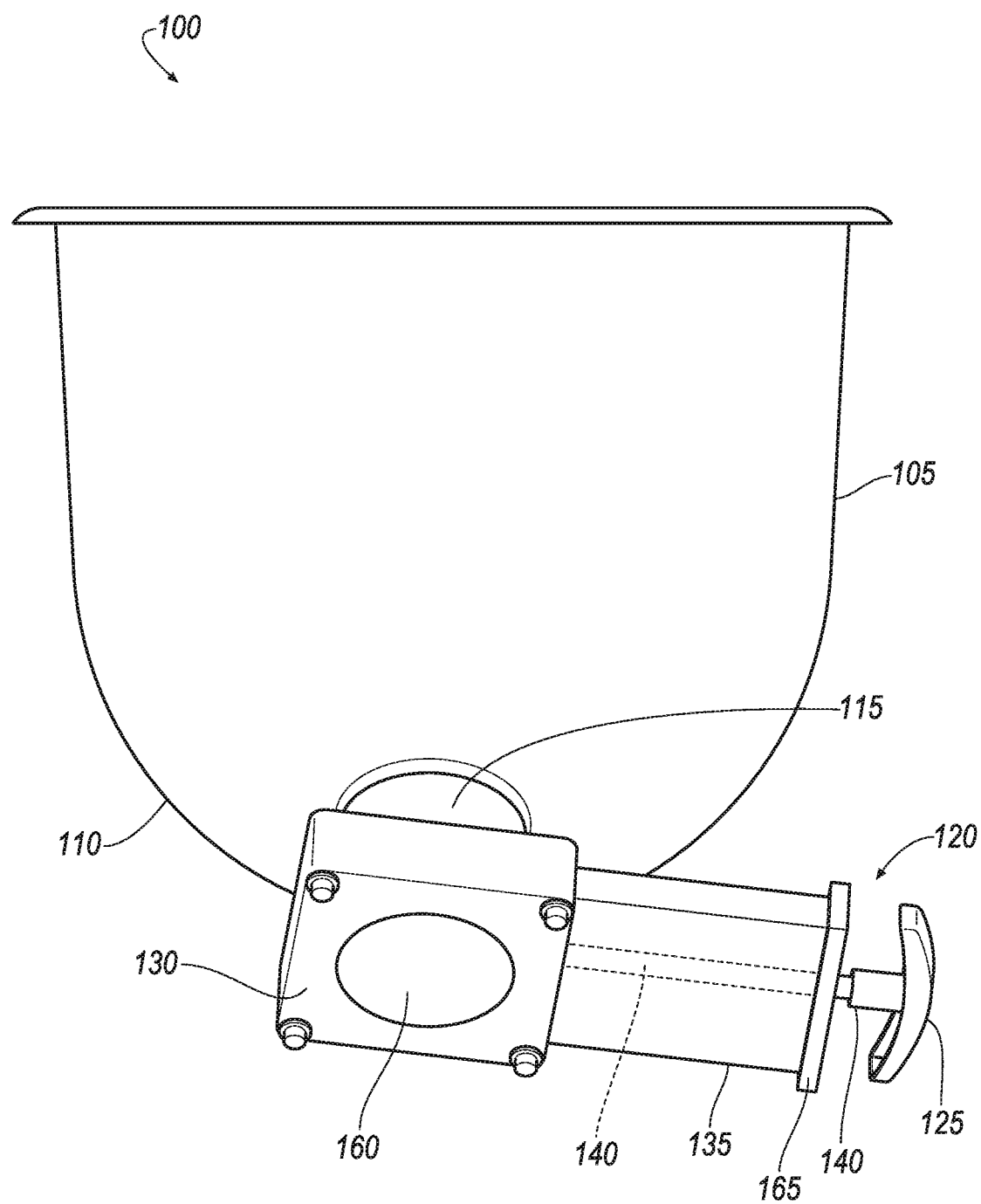
FIG. 4 illustrates a front perspective view of an example mixer apparatus with a valve in the closed position.

A user may actuate the seal portion 160 via the handle 125 to move the seal portion 160 between open and close positions. FIGS. 1-3 illustrate the seal portion 160 in an open or extended position. In this position, the seal portion 160 sits inside the stop portion 135. FIG. 4 illustrates the seal portion 160 in the closed position.

In the open position, the seal portion 160 may allow the base opening 145 to be unobstructed. This may permit batter or other contents within the bowl 105 to flow through the bowl opening 110, through the connecting mechanism 115, and out through the base opening 145. Thus, instead of lifting and tilting the bowl 105 from the mixing apparatus, the bowl 105 may remain on a solid surface and the batter or other contents may leave the bowl via the bowl opening 110.

To maintain the batter or other contents within the bowl, the user may push the handle towards the base portion 130 close the base opening 145. The seal portion 160 may thus transition to the closed position to create a seal at the base portion 130 to prevent batter from leaving the bowl 105.

The seal portion 160 may also allow the user to create a variable and adjustable flow rate of the batter or other contents through use of an intermediate position between the closed position and the open position. In such an intermediate position, the seal portion 160 may partially obstruct the base opening 145. The amount of obstruction may correlate to a flow rate of the batter from the bowl 105 where the less the obstruction the higher the flow rate and vice versa. That is, in the intermediate position the seal portion 160 is configured to seal a portion of the base opening 145 to allow contents of the bowl 105 to exit through the base opening 145 at varying rates corresponding with the position of the seal portion 160 relative to the base opening 145.

Thus, the valve 120 may allow a user to easily remove batter and/or other contents from the bowl 105 at variable and customizable rates. This may be generally more efficient, less strenuous, and allow for a more accurate flow rate than pouring the batter by tipping the bowl. Furthermore, bodily injury and strain may be reduced by avoiding the need to physically lift and/or tip the bowl to fill trays, other bowls, pans, etc. Moreover, a more accurate pour may be achieved via the valve 120, as a more constant and consistent flow of batter may be achieved. The above advantages may increase kitchen and bakery efficiencies, while decreasing waste, manpower, and processing time.

While specific shapes are shown with respect the connecting mechanism, base portion, seal portion, and stop portion, several other implementations may be possible and practical. Further, while the disclosed concept is generally described with respect to confections and batter, multiple other uses and applications may also be possible. For example, the mixing apparatus may be used for pizza, pasta, cookies, sauces, dressings, etc.

Further, while not shown, a cap or cover may be placed over the bowl opening 110 in order to allow the bowl 105 to maintain its contents when the valve 120 is not attached to the bowl 105. In the examples herein, the valve 120 may be selectively attachable and detachable in order to allow for use with other bowls and apparatus. The valve 120 may also be selectively removed for cleaning, storing, etc. During non-use, a stop or cap may be placed in or on the bowl opening 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mixing apparatus, comprising:
    a bowl defining at least one bowl opening towards a base of the bowl for contents of the bowl to exit therefrom; and
    a valve assembly configured to selectively attach to the bowl at the bowl opening, the valve assembly including:
        a connecting mechanism including a body attachable to the bowl and defining an opening configured to align with the bowl opening,
        a base portion connected to the connecting mechanism and defining a base opening, wherein the base portion and the connecting mechanism define a passage between the bowl opening and the base opening,
        a housing connected to and external of the base portion, the housing defining a hollow interior,
        a seal portion moveable between the hollow interior of the housing and the base portion, wherein the seal portion is moveable between an open position and a closed position, and
        a handle attached to the seal portion, wherein the handle is operable to move the seal portion between the open and closed positions, wherein:
    in the open position, the seal portion is in the hollow interior of the housing un-obstructing the base opening of the base portion to have the contents of the bowl accessible from the base opening via the passage, and
    in the closed position, the seal portion is at the base portion blocking the base opening to inhibit the contents of the bowl from being accessible via the base opening and the passage.

2. The apparatus of claim 1, wherein the valve assembly includes at least one rod connected to the handle and arranged between the handle and the seal portion, wherein the at least one rod is configured to extend through the housing and, with the handle, is operable to move the seal portion between the open and closed positions.

3. The apparatus of claim 1, wherein the connecting mechanism is a threaded and hollow tube configured to mate with the bowl opening.

4. The apparatus of claim 1, wherein the seal portion is formed of a malleable material to create a hermitical seal within the base portion to prevent the contents of the bowl from exiting the base opening when the seal portion is in the closed position.

5. The apparatus of claim 1, wherein, in an intermediate position between the open and closed positions, the seal portion is partially provided at the base portion partially obstructing the base opening to allow the contents of the bowl to exit through the base opening at varying rates corresponding with the position of the seal portion relative to the base opening.

6. A valve assembly configured to selectively attach to a mixing bowl, the valve assembly comprising:
    a connecting mechanism including a body attachable to the bowl and defining an opening;
    a base portion defining connected to the connecting mechanism and defining a base opening, wherein the base portion and the connecting mechanism define a passage between a bowl opening and the base opening;
    a housing connected to and external of the base portion, the housing defining a hollow interior; and
    a seal portion moveable between the hollow interior of the housing and the base portion, wherein the seal portion is moveable between an open position and a closed position, wherein:
    in the open position, the seal portion is in the hollow interior of the housing un-obstructing the base opening of the base portion to have contents of the bowl accessible from the base opening via the passage, and
    in the closed position, the seal portion is at the base portion blocking the base opening to inhibit the contents of the bowl from being accessible via the base opening and the passage.

7. The assembly of claim 6, further comprising a handle attached to the seal portion and configured to actuate the seal portion between open and closed positions.

8. The assembly of claim 7, further comprising at least one rod arranged connected to the handle, wherein the at least one rod is configured to extend through the housing and, with the handle, is operable to move the seal portion between the open and closed positions.

9. The assembly of claim 6, wherein the connecting mechanism is threaded and hollow tube configured to mate with the bowl opening.

10. The assembly of claim 6, wherein the seal portion is formed of a malleable material to create a hermitical seal within the base portion to prevent the contents of the bowl from exiting the base opening in the closed position.

11. The assembly of claim 6, wherein, in an intermediate position between the open and closed positions, the seal portion is configured to seal a portion of the base opening to allow the contents of the bowl to exit through the base opening at varying rates corresponding with the position of the seal portion relative to the base opening.

12. A mixing apparatus, comprising:
    a bowl defining at least one bowl opening towards a base of the bowl for contents of the bowl to exit therefrom; and
    a valve assembly configured to selectively attach to the bowl at the bowl opening, the valve assembly including:
        a connecting mechanism including a body attachable to the bowl and defining an opening configured to align with the bowl opening,
        a base portion connected to the connecting mechanism and defining a base opening, wherein the base portion and the connecting mechanism define a passage between the bowl opening and the base opening,
        a housing connected to and external of the base portion, the housing defining a hollow interior, and
        a seal portion moveable between the hollow interior of the housing and the base portion, wherein the seal portion is moveable between an open position and a closed position, wherein:
    in the open position, the seal portion is in the hollow interior of the housing un-obstructing the base opening of the base portion to have the contents of the bowl accessible from the base opening via the passage, and in the closed position, the seal portion is at the base portion blocking the base opening to inhibit the contents of the bowl from being accessible via the base opening and the passage.

\* \* \* \* \*